United States Patent [19]
Ash et al.

[11] Patent Number: 5,392,344
[45] Date of Patent: Feb. 21, 1995

[54] COMMUNICATIONS NETWORK CLASS-OF-SERVICE ROUTING

[75] Inventors: Gerald R. Ash, West Long Branch; Jin-Shi Chen, Holmdel, both of N.J.; Alan E. Frey, Naperville, Ill.; David F. McGuigan, Franklin Township, Somerset County, N.J.

[73] Assignee: AT&T Corp., Murray Hill, N.J.

[21] Appl. No.: 770,396

[22] Filed: Oct. 3, 1991

[51] Int. Cl.$^6$ ............... H04M 7/00; H04M 11/00; H04M 15/00; H04M 3/00
[52] U.S. Cl. ............................ 379/221; 379/94; 379/112; 379/243
[58] Field of Search ............... 379/201, 207, 210, 219, 379/220, 221, 243, 244, 94, 112

[56] References Cited

U.S. PATENT DOCUMENTS

| | | | |
|---|---|---|---|
| 4,191,860 | 3/1980 | Weber | 379/211 X |
| 4,577,066 | 3/1986 | Bimonte et al. | 379/243 X |
| 4,837,816 | 6/1989 | Mizuhara et al. | 379/221 |
| 5,086,460 | 2/1992 | Ash et al. | 379/221 |
| 5,101,451 | 3/1992 | Ash et al. | 379/221 |
| 5,131,016 | 7/1992 | Broughton et al. | 379/221 |

FOREIGN PATENT DOCUMENTS

| | | | |
|---|---|---|---|
| 0250791 | 10/1987 | Japan | 379/220 |
| 0108862 | 5/1991 | Japan | 379/94 |

OTHER PUBLICATIONS

13th International Teletraffic Congress, Copenhagen, Denmark, Jun. 1991 "Real-Time Network Routing in a Dynamic Class-of-Service Network", Teletraffic and Datatraffic, ..., ITC-13, G. R. Ash et al., pp. 187–194.
U.S. Patent Application bearing Ser. No. 291,845 filed Dec. 29, 1988 on behalf of G. R. Ash et al and abandoned in favor of Ser. No. 501,344.

Primary Examiner—James L. Dwyer
Assistant Examiner—Harry S. Hong
Attorney, Agent, or Firm—Frederick B. Luludis

[57] ABSTRACT

The routing of calls of different classes of services as well as the administration thereof is enhanced by associating each such class of service with a number of parameters common to such services, such that each class of service, as well as a new class of service, may be readily identified by its respective parameter values. Accordingly, the routing and administration of calls of different classes of services may be handled in a systematic, straight forward manner so that basic network capabilities may be made available to various services using an administratively defined menu like structure. In addition, such class of service advantageously partitions network bandwidth allocation, call routing priority, voice/data transport, and traffic data registers into respective classes of services.

17 Claims, 3 Drawing Sheets

500

| RPI INDEX | PRIORITY LEVEL | SI,TC,VALUES |
|---|---|---|
| 1 | N | (1,1),(2,1),(3,1),(4,1),(5,1),(7,1),(10,1),(11,1),(12,1),(13,1),(14,1),(17,1) |
| 2 | K | (8,1),(9,1),(16,1),(22,1),(23,1),(28,1) |
| 3 | N | (16,2),(25,2) |
| 4 | K | (m,2) |
| 5 | N | (6,3),(25,3) |
| 6 | N | (6,4) |
| 7 | N | (6,5) |
| 10 | L | (p,1) |
| 15 | L | (q,1) |

| | ORIGIN | DESTINATION | SIGNALING SERVICE TYPE | DIALED SERVICE TYPE | S I |
|---|---|---|---|---|---|
| 300-1 | LEC | LEC | LDS | — | 7 |
| 300-2 | LEC | LEC | LDS | INWATS | 4 |
| 300-3 | NODAL | NODAL | SDN | — | 1 |
| 300-4 | LEC | ISC | LDS | — | 13 |
| 300-5 | NODAL | LEC | SDS | — | 6 |
| 300-6 | ISC | LEC | LDS | INWATS | 8 |
| 300-7 | aa | bb | cc | — | m |
| 300-8 | aaa | bbb | ccc | — | p |
| 300-9 | dd | ee | ff | gg | q |
| | ⋮ | ⋮ | ⋮ | ⋮ | ⋮ |

| MEDIA/RATE | TC |
|---|---|
| VOICE | 1 |
| 64kb\s-R | 2 |
| 64kb\s-C | 3 |
| 384kb\s-C | 4 |
| 1.536kb\s-C | 5 |

| RPI INDEX | PRIORITY LEVEL | SI,TC,VALUES |
|---|---|---|
| 1 | N | (1,1),(2,1),(3,1),(4,1),(5,1),(7,1),(10,1),(11,1),(12,1),(13,1),(14,1),(17,1) |
| 2 | K | (8,1),(9,1),(16,1),(22,1),(23,1),(28,1) |
| 3 | N | (16,2),(25,2) |
| 4 | K | (m,2) |
| 5 | N | (6,3),(25,3) |
| 6 | N | (6,4) |
| 7 | N | (6,5) |
| 10 | L | (p,1) |
| 15 | L | (q,1) |

FIG. 5

| ROUTE STATUS | NSN | | |
|---|---|---|---|
| | 210 | 220 | 225 |
| LL | 0 | 1 | 1 |

FIG. 6

| ROUTE STATUS | NSN | | |
|---|---|---|---|
| | 210 | 220 | 225 |
| LL | 1 | 1 | 0 |

FIG. 7

| ROUTE STATUS | NSN | | |
|---|---|---|---|
| | 210 | 220 | 225 |
| LL | 0 | 1 | 0 | ns network class-of-service routing

COMMUNICATIONS NETWORK CLASS-OF-SERVICE ROUTING

FIELD OF THE INVENTION

The invention relates to telecommunications networks, such as a public switched network, and more particularly relates to con,oiling the way in which telephone calls, and the like, associated with respective classes of network services are routed through a telecommunications network.

BACKGROUND OF THE INVENTION

Routing is a communications network function that is performed to advance a telephone call from an origination point to a destination point. Such a routing function is, therefore, at the heart of the architecture, design and operation of a communications network. Most routing functions were initially designed to route what is commonly referred to as "Plain Old Telephone Service" (POTS) calls. Thereafter, to meet customer and competitive demands, communications networks began offering additional services, such as, for example, (a) digital seduces for transporting data, (b) very low blocking services to ensure with a high level of probability that associated service calls are routed to their destinations during times of network congestion, and (c) the well-known 800 and 900 number services. The introduction of a new service is usually accompanied by a change in the underlying routing function so that telephone calls associated with the new service may be properly routed to their respective destinations. However, over time, each such change may cause the underlying network routing function to become complex and unwieldy to administer, thereby making it difficult to further change the routing function to accommodate other new services.

SUMMARY OF THE INVENTION

The art of telecommunications switching is advanced, in accord with the invention, by associating each such class of service with a number of parameters common to all such services and by distinguishing different classes of services from one another by their respective parameter values. In particular, each such class of service is associated with a service identity value and a transport capability value which control the routing of an associated call to its destination. In an illustrative embodiment of the invention, a pair of service identity and transport capability values are translated into a respective routing pattern identity value defining a respective blocking objective. The routing of a call to its destination is thus controlled by a blocking objective specified by a respective routing pattern identity value derived for the associated call.

BRIEF DESCRIPTION OF THE DRAWINGS

In the drawing:

FIG. 2 illustrates an example of a table that may be used in the network of FIG. 1 to translate information associated with a call into a respective service identity value;

FIG. 3 illustrates an example of a table that may be used in the network of FIG. 1 to translate a transport capability associated with a call into a respective transport capability value;

FIG. 4 illustrates an example of a table that may be used in the network of FIG. 1 to translate a pair of service identity and transport capability values into a respective routing pattern identity value; and FIGS. 5-7 illustrate examples for selecting a multilink path to route a call under particular traffic conditions.

DETAILED DESCRIPTION

Figure 1:
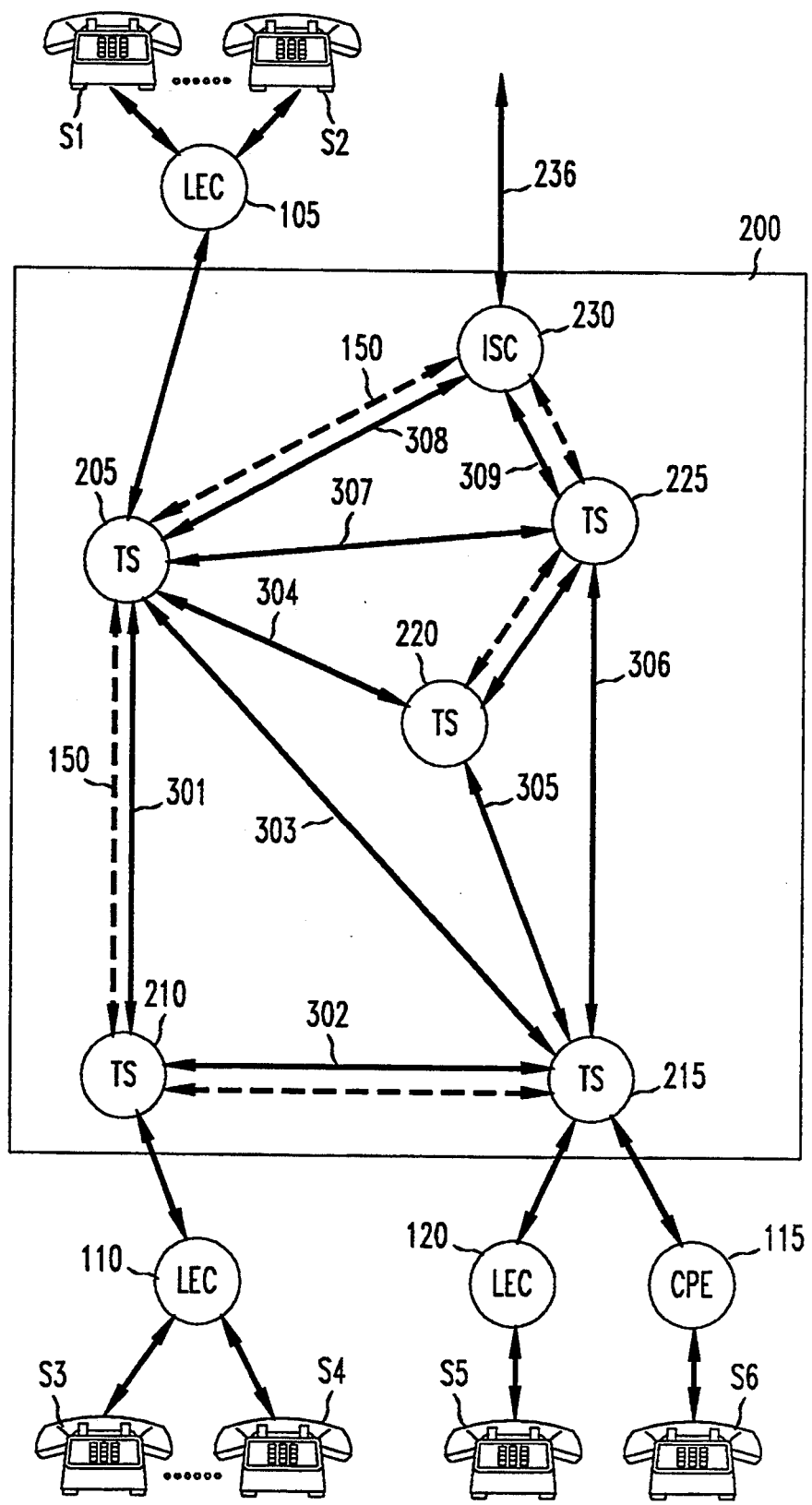
FIG. 1 is a broad block diagram of a telecommunications network in which the principles of the invention may be practiced.

In an exemplary embodiment of the invention, communications network 200 shown in FIG. 1 may be a telephone network, such as, for example, the well-known AT&T public switched network that provides a plurality of voice and data services for its user (subscribers), such as the subscriber associated with telephone station set S1. Network 200 includes, inter alia, a plurality of Toll Switches (TS), e.g., 205, 210, and 215, and International Switching Centers (ISC), e.g., 230. As is well-known, an ISC is used to establish communications (telephone) connections between network 200 and an overseas switching center, such as a switching center located in the United Kingdom. Such overseas connections are represented in the FIG. by communications path 236.

Toll switches 205, 210 and 215 as well as ISC 230 may be any one of the well-known types of switching equipment, such as, for example, the No. 4ESS (Electronic Switching System) available from AT&T. It is seen from the FIG. that a toll switch, e.g., TS 205 (210, 215), may be connected to a number of so-called central offices provided by Local Exchange Carriers (LECs), such as LEC 105 (110, 120). A toll switch, e.g., TS 215, may also be connected to what is commonly referred to as Customer Provided Equipment (CPE), which may be, for example, a so-called private branch exchange. The operation of a central office as well as a private branch exchange is well-known and will not be discussed herein. However, it suffices to say that a central office or CPE is arranged to send to an associated network 200 toll switch a telephone call originated at a calling telephone station set (herein the calling party), e.g., S5 or S6, which has dialed a particular long distance telephone number. A central office or CPE is also arranged to connect to a telephone station set, e.g., S4, (herein the called party) a call that the CO or CPE receives from an associated toll switch.

In addition, each toll switch, e.g., 205, 210, etc., and ISC, e.g., 230, is connected to a data link 150, which may be, for example, the well-known Common Channel Signaling System network (CCS). CCS network 150 is arranged so that the toll switches and ISCs may exchange data messages with one another in order to establish via network 200 a connection between two facilities, e.g, central offices, respectively serving a calling telephone station, e.g.,station S1, and a called telephone station, e.g., station S4.

In contemplation of the invention, each telephone call processed by network 200 is associated with a particular class of service (COS), and each such service is defined, in accord with an aspect of the invention, by a group of parameters, for example, four parameters. The respective values of the four parameters define the type of routing and transport capability that are accorded to the associated COS.

Specifically, the group of parameters associated with a particular COS includes what we call Service Identity (SI), Transport Capability (TC), Routing Pattern Identity (RPI) and Circuit Selection Identity (CSI). SI identifies a particular service, e.g., Long Distance Service (LDS), Software Defined Network (SDN) service, 800 service, etc., and/or calling feature associated with an incoming call originating at a toll switch, e.g., TS 205. Such a calling feature may be, for example, what is commonly referred to as "Priority Routing", as will be explained below in detail. In an illustrative embodiment of the invention, an SI is derived for each incoming call based on information associated with the call. Such information includes (a) whether the incoming call originated at a LEC or CPE (CPE is also referred to herein as a nodal); (b) whether the destination point is a LEC, nodal or an International Switching Center ( e.g., ISC 230); (c) signaling service type, e.g., voice; and (d) dialed service type, such as, for example, special access codes for 800 number services.

As is well-known, the origination (e.g., LEC) and destination (e.g., ISC) points associated with an incoming call at a toll switch may be determined from the identity of the trunk group which receives the incoming call at the toll switch and the dialed digits identifying the called station, respectively. For example, if the dialed digits happen to be NPA-xxx-yyyy (where NPA defines part of the North American dialing plan commonly referred to as the "N umbering P lan A rea code"), then it is likely that a LEC is the destination point for the associated call. If the format of the dialed digits define a so-called country code (i.e, a code associated with on overseas country), for example, 011-aa-bb-xxx-yyyy, then it is likely that the destination point is an ISC, e.g., ISC 230. As a last example, if the dialed digits (e.g., xxx-yyyy) are not accompanied by an NPA or country code, then it is likely that a nodal (CPE) is the destination point.

The next parameter, Transport capability (TC) defines the transmission capability that will be used in routing an incoming call to a destination toll switch, in which the transport capability may be, for example, voice transmission, or data transmission (e.g., 64 kb/s, 384 kb/s, etc). The TC parameter may be determined from the identity of the trunk group that receives the incoming call at the originating toll switch, or from particular digits prefixed to the dialed number. For example, for a so-called Accunet switched 56 digital data service, the prefix digits would be 700-056-xxxx.

As will be shown below, the SI and TC values derived for an incoming call are then mapped (translated), in accord with an aspect of the invention, into another parameter, which we call a Routing Pattern Identity (RPI). The RPI value is then used to specify the routing treatment that should be accorded to an associated incoming call. In an illustrative embodiment of the invention, such treatment is defined as a so-called blocking objective, i.e., a particular level of call blocking, as well as the routing priority, bandwidth allocation, voice-/data transport, data rate, and traffic data registers. All of these parameters can be set independently by the class of service, and in this manner define a separate virtual network on the shared transport network for each class of service. The routing priority is used by a toll switch experiencing traffic congestion as a means for determining whether the routing of a particular call to a destination toll switch should be given preference over other calls. That is, during such traffic congestion, a call associated with a first RPI value would be given routing preference over another call associated with a second RPI value. Whereas, a call associated with the second RPI value would be given routing preference over a call associated with a third RPI value, and so on. (As an aside, the highest routing preference is commonly referred to as "key service protection", as will be explained below.)

As discussed above, a communications network routing function is changed from time to time to accommodate a new service. Such a change is not achieved easily, and typically entails adding a new software program module to the routing function and changing other such modules, thereby causing the routing function to become, over time, complex and unwieldy to administer.

We deal with this problem by providing at each toll switch a first table comprising a plurality of records each comprising a plurality of fields. One of the fields of a record identifies a respective SI value and the remainder of such fields identify the information that is derived from the dialed number and/or identity of the trunk associated with an incoming call. We also provide at each toll switch a second table for associating a particular transport capability with a respective value, and a third table for translating the values of a particular SI, TC pair into a respective RPI value. Accordingly, then, the administration of the routing function vis-a-vis adding a new or deleting an existing service boils down to, in accord with an aspect of the invention, adding or deleting an entry in the first table and, possibly, an entry in the second table and third tables.

In addition, each such toll switch is arranged, in accord with an aspect of the invention, to pass to a succeeding toll switch involved in establishing a connection between the incoming call and a telephone station identified by the dialed digits, the associated TC and SI values. The progression of a call connection is therefore controlled by its associated COS type as characterized by TC and SI values derived at the originating toll switch. Each succeeding switch may then use the SI and TC values to control the routing of the associated call to a next switch.

Turning now to FIG. 2, there is shown an illustrative example of a table 300 that an originating toll switch may use to translate the aforementioned information associated with an incoming call ("calling information") into an SI (service identity) value. It is seen from the FIG. that fields 301 through 304 define, inter alia, respective parameters associated with an incoming call (i.e., the aforementioned calling information), which, in combination, define a respective SI value shown in field 305 of the associated record. Advantageously, then, all that an originating toll switch, e.g., TS 205 (FIG. 1 ), needs to do to identify the type of service that should be accorded to an incoming telephone call is to consult table 300 Moreover, in the event that network 200 introduces a new service, then table 300 may be easily updated to include that service.

In particular, field 301 of a table 300 record contains a parameter defining whether the ingress point of an incoming call is, for example, a local exchange carrier (LEC), nodal, ISC, etc. Field 302 of table 300 contains a parameter indicating whether, at a network 200 egress point, the incoming call will be routed to its ultimate destination (called station) via, for example, a LEC, nodal, ISC, etc. Field 303 contains a parameter identifying a signaling service type that is associated with the incoming call. (That is, the SI value is a function of the type of received signaling information.) Such signaling service types include, inter alia, conventional Long Distance Service (LDS) and what is commonly referred to as a Software Defined Network (SDN). Field 304 of a table 300 record contains a parameter defining a dialed service type that is associated with an incoming call. (That is, the SI value is also a function of the dialed number information.) In the instance where field 303 of the associated record defines the incoming call dialed number information as being conventional LDS, then the contents of the associated field 304 contains a null word, which is represented in the FIG. by a "dash", as is shown for records 300-1, 300-3 and 300-4. In other instances, the contents of field 304 defines one of a number of different dialed service types, for example, INWATS, as defined by associated dialed number information. The last field 305 of a table 300 record provides an SI value. For example, the parameters (contents) shown in fields 301 through 304 of record 300-1, in combination, define an SI value of 7. Whereas, the contents of fileds 301 through 304 of records 300-5 and 300-6 define SI values of 6 and 8, respectively. The contents of fields 301 through 304 of records 300-7 through 300-9 and their associated SI values represent the remaining records of table 300 as well as records that may be added in the future to support new classes of services.

Turning now to FIG. 3, there is shown table 400 that an originating toll switch may use to translate quickly a transport capability (TC) into a particular value for the purpose of determining the RPI (Routing Pattern Identity) for an incoming call. As mentioned above, a TC may be either voice or digital data. For digital data, each entry (record) in table 400 defines a particular data rate as well as a transmission format, e.g., a restricted format (R) or clear channel format (C).

Turning now to FIG. 4, there is shown table 500 that an originating toll switch may use to translate a SI and TC combination (or pair) into a particular RPI value, or index. For example, the SI, TC pairs of (6,3) translate into an RPI value of 5 defining a so-called Normal (N) priority level for the associated service. As another example, the SI,TC pair of (8,1) translate into an RPI value of 2 defining a so-called Key (K) service priority level for the associated service. In an illustrative embodiment of the invention, and, as mentioned above, the key service priority level defines the highest priority level that may be accorded to a respective service, and takes precedence over a lower priority level, such as the normal (N) priority level. As a further example, SI,TC pairs of (p,1) and (q,1) translate into respective RPI values of, for example, 10 and 15, respectively. The RPI values of 10 and 15 respectively define, for example, a Low (L) priority level.

(Hereinafter, for the sake of discussion, and not by way of limitation, the terms "Lightly Loaded" (LL) and "Heavily Loaded" (HL) when used in reference to the load status of a direct path between two toll switches will be taken to mean that of the number of trunks forming the path more than 5%, and less than 5% are available, respectively. The term "Key Reserved State" will be taken to mean that only trunks reserved for key services are available and the term "busy", if used, will be taken to mean that all such trunks are busy.)

Thus, in accord with an aspect of the invention, the RPI values define a hierarchy of priority levels ranging from key service, the highest priority level objective, to L, the lowest priority level. Accordingly, the routing of an incoming call associated with a particular class of service defined by a respective pair of SI and TC values is controlled by an associated RPI value, as will be explained below.

For example, assume that for a call defining a SI, TC pair of (q,1) the originating and destination toll switches are toll switches 205 and 215, respectively. Also assume that the current level of traffic (load status) for direct path 303 (FIG. 1) has reached the HL state. In such situation, then, the call would not be advanced via direct path 303 since the L priority level set for a SI,TC pair of (q,1) does not meet the current HL load state assumed for path 303. If, on the other hand, the call defined a SI,TC pair of (1,1) then TS 205 would route the call to TS 215 via direct path 303, since, in accord with illustrative table 500, the priority level (RPI) for pair (1,1) is Normal (N), which meets the current load state assumed for path 303. However, if the current level of traffic for path 303 happened to be at the Key reserved load state, then TS 205 would route the call over path 303 only if the call defined a SI,TC pair that is accorded a key service priority level, such as, for example, the SI,TC pan: of (8,1). If the call cannot be routed via a direct path, then a toll switch, e.g., TS 205, would attempt to route the call via an alternate route, as explained below.

The instant invention is particularly advantageous when practiced in conjunction with the alternate routing arrangement that is commonly referred to as Real Time Network Routing (RTNR). RTNR is disclosed in "Real-Time Network Routing in a Dynamic Class-of-Service Network", G. R. Ash, et al, 13*th International Teletraffic Congress*, pp. 187–194, which is hereby incorporated by reference. Briefly, and referring to FIG. 1, if an originating toll switch, e.g., 205 cannot advance (route) a call to a destination toll switch, e.g., TS 215, via a direct link, e.g., path 303, then the originating toll switch may attempt to advance the call via a multiple-link path, e.g., a two-link path. A multiple-link path comprises a direct path (link) between the originating toll switch and an intermediate toll switch and a direct path (link) between the latter toll switch and the destination toll switch. The originating toll switch locates such a multiple-link path by sending to the destination toll switch via CCS network 150 a message requesting the current traffic levels (load states) of other direct links between the destination toll switch and other toll switches. In response to the request, the destination switch returns to the originating switch via CCS network 150 a number of so-called bit maps indicative of such load states. The bit maps respectively identify which direct paths from other toll switches to the destination toll switch are lightly loaded, normally loaded, key and busy.

Upon receipt of the bit maps the originating toll switch logically compares ("ands") them with its own bit maps identifying the current load states of respective direct paths between the originating toll switch and the other toll switches. The resulting bit maps then identify effectively the load states of respective multiple-link paths between the originating and destination toll switches.

An illustrative example of such a bit map relating to lightly loaded states which a destination switch, e.g., TS 215, may return to an originating toll switch, e.g., TS 205, is shown in FIG. 5. As indicated by the binary value of one, only the direct path from toll switch 215 to toll switch 220 is lightly loaded. As mentioned, the originating toll switch maintains its own bit maps of the load states of direct paths to other toll switches. One possible example of the bit map relating to lightly loaded states which the originating toll switch may maintain is shown in FIG. 6. Similarly, as indicated by the binary values of one shown in the latter FIG., direct paths from originating toll switch 205 to toll switches 210 and 220 are most lightly loaded. The result of "anding" the bit maps of FIGS. 5 and 6 is shown in FIG. 7. FIG. 7 indicates in a similar manner that a lightly loaded multiple-link path involving toll switch 220 as an intermediate toll switch may be available. (It is noted that, although not shown in the FIGs., the originating toll switch could also generate bit maps respectively identifying normally loaded and key service multiple-link paths.)

Accordingly, then, originating toll switch 205 would, in accord with FIG. 7, route the call to destination switch 215 via a path 304 trunk capable of satisfying the transport capability specified by the associated call. In doing so, the originating switch would send to the intermediate switch, the TC and SI values associated with the call. If, in the event that such a trunk is not available, then TS 205 would block the call if the call is associated with a blocking object of LL. TS 205 would do so, since FIG. 7 indicates that no other multiple-link path is available for a blocking objective of LL. However, if the call were associated with a higher priority level, e.g., key service, or if the blocking objective for this service is not being met, then TS 205 would consult its remaining "resulting" bit maps to locate another available multiple-link path having the requisite transport capability. If such a path is available, then TS 205 would route the call to the intermediate switch switch via that path. The intermediate switch would then route the call to destination switch 215. If a path is not available, then TS 205 would block the call.

As mentioned above, at the request of the originating switch, the destination switch returns bit maps identifying the loads states of direct paths to other toll switches. As also mentioned above, the destination switch returns a bit map for each of the load states. In contemplation of the invention, the destination switch may be advantageously arranged so that it returns to the originating switch only those bit maps which satisfy the blocking objective associated with the class of service of the pertinent telephone call.

In particular, the originating switch may include in the aforementioned request message that it sends to the destination switch the priority level value associated with the pertinent call. If the priority level value happened to be, for example, Low (L) priority, then the destination switch would return to the originating switch only the bit map identifying the lightly loaded (LL) direct paths (links) connected between the destination switch and other switches, if any. Thus, the destination switch would, in the latter case, return just one bit map rather than three or four bit maps. If, on the other hand, the priority level value happened to be, for example, key service priority (K), then, in that case, the destination switch would return, for example, three bit maps. As discussed above, the three bit maps would respectively identify lightly loaded, heavily loaded and key reserved state direct paths connected between the destination switch and other switches.

As is well-known, an originating switch creates a billing record for each incoming call that it processes and is answered by a called party. As is also well-known, a billing record is associated with the calling party's telephone number. Periodically, the billing records that have been created by an originating switch over a predetermined duration of time are presented to a billing center for processing. As a result of such processing, "telephone bills" are created and sent to respective subscribers. Typically, a telephone bill includes such information as, for example, the called number, date and time of the call and duration of the call. A billing record may also include a service code that identifies an associated class of service so that the billing center may associate a call with a class of service.

As an aspect of the invention, the SI and TC values that an originating switch derives for a call may be substituted in the associated billing record for the aforementioned service code. Accordingly, the billing center may then associate the SI and TC values contained in a billing record with a respective class of service and include the latter information in the respective telephone bill, thereby eliminating the need to maintain and administer such service codes.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. An arrangement for processing a telephone call in a telecommunications system comprising a plurality of switches interconnected by individual ones of a plurality of communications paths, said processing being based on a class of service associated with the incoming call, said arrangement comprising at each of said switches a first translation table formed from a plurality of records each comprising a plurality of fields respectively containing particular parameters characterizing a particular telephone class of service and further containing an associated service identity value indicative of said class of service, means, responsive to receipt of an incoming call at a respective one of said switches, for deriving from information associated with said incoming call a transport capability value and the parameters characterizing the telephone service that should be associated with the incoming call and for translating said derived parameters into the associated service identity value using said first translation table and means for deriving a routing index as a function of the transport capability and service identity values derived for said incoming call and for then routing said incoming call to a destination switch in accordance with said routing index.

2. The arrangement set forth in claim 1 wherein said means for routing said incoming call includes means operative in the event that said incoming call cannot be routed to said destination via a route selected as a function of said routing index for then routing said call via another route having a current blocking objective that is not being met for the class of service associated with said incoming call.

3. The arrangement set forth in claim 2 wherein said incoming call is received at an originating one of said switches and said selected route is a multiple-link path and wherein said originating switch includes means operative for identifying said multiple-link path as a function of information obtained from said destination switch, such that the load status of said multiple-link path is commensurate with the routing index derived for said incoming call.

4. The arrangement set forth in claim 1 wherein said parameters include at least a service signaling type and dialed service type.

5. The arrangement set forth in claim 1 wherein said means for deriving includes means for deriving a circuit selection identity value from said information and wherein said service identity and transport capability values and said circuit selection identity value and said routing pattern index define the class of service that is associated with said incoming call.

6. The arrangement set forth in claim 1 wherein said incoming call is associated with a billing record and wherein said SI and TC values are included in said billing record so that an associated billing center may include at least the class of service associated with said call in a telephone bill.

7. The arrangement set forth in claim 1 wherein said routing index specifies a routing treatment used in the processing of said call, said routing treatment including a blocking objective that is used in the selection of a route to said destination switch.

8. The arrangement set forth in claim 1 wherein said routing index specifies a routing treatment that is used in the processing of said call, said routing treatment including a routing priority value specifying whether said call may be routed over a particular path reserved for a call associated with key services.

9. The arrangement set forth in claim 1 wherein said routing index specifies a routing treatment that is used in the processing of said call, said routing treatment including a bandwidth allocation value indicative of the level of bandwidth that is to be assigned to said call.

10. A method for use in a telecommunications system comprising a plurality of switches interconnected by individual ones of a plurality of communications paths, said method controlling the routing of an incoming call based on a class of service associated with the incoming call, said method comprising the steps of
   storing in memory a translation table formed from a plurality of records each comprising a plurality of fields respectively containing particular parameters characterizing a respective class of telephone service and further containing an associated service identity value indicative of said telephone service,
   responsive to receipt of an incoming call at a respective one of said switches, deriving from information associated with said incoming call a transport capability value and the parameters characterizing the telephone service associated with the incoming call and then translating said derived parameters into the associated service identity value using said translation table, and
   deriving a routing index as a function of the transport capability and service identity values derived for said incoming call and then routing said incoming call to a destination switch via a route selected as a function of said routing index.

11. A method for use in a telecommunications system comprising a plurality of switches interconnected by individual ones of a plurality of communications paths, said method controlling the routing of an incoming call based on a class of service associated with the incoming call, said method comprising the steps of
   storing in memory a translation table formed from a plurality of records each comprising a plurality of fields respectively containing particular parameters characterizing a respective class of telephone service and an associated service identity value indicative of said telephone service,
   responsive to receipt of an incoming call at a respective one of said switches, deriving from information associated with said incoming call a transport capability value and the parameters characterizing the telephone service associated with the incoming call and then translating said derived parameters into the associated service identity value using the stored translation table,
   routing said incoming call to a destination switch as a function of said service identity and transport capability values derived for said incoming call, wherein said step of routing includes the steps of defining, as a function of said service identity and transport capability values derived for said incoming call, a priority level, and
   selecting as a route to said destination switch a route having a current load status commensurate with the priority level derived for said incoming call.

12. The method set forth in claim 11 wherein said step of deriving includes the step of deriving a circuit selection identity value from said information and deriving a routing pattern index as a function of said service identity and transport capability values and wherein said service identity and transport capability values and said circuit selection identity value and said routing pattern index define the class of service that is associated with said incoming call.

13. The method set forth in claim 11 wherein said route is a multiple-link path and wherein said step of routing includes the step of identifying said multiple-link path as a function of information obtained from said destination switch, such that the load status of said multiple-link path is commensurate with the priority level defined for said incoming call.

14. A method of processing a call in a telecommunications system comprising a plurality of switches interconnected by individual ones of a plurality of communications paths, said method selecting a route to a destination switch for an incoming call based on a class of service associated with the incoming call and comprising the steps of
   storing in memory a first table formed from a plurality of records each having a plurality of fields, one of said fields of each of said first table records containing a respective service identity value associated with a respective one of said classes of services, and other ones of said fields containing information associated with an incoming call that is to be routed in accord with a respective one of said classes of services,
   storing in memory a second table formed from a plurality of records each having a plurality of fields, one of said fields of each of said second table records containing at least one pair of service identity and transport capability values and at least another one of said fields of each of said second table records containing a respective routing pattern identity value,
   receiving an incoming call at an originating one of said switches,
   translating information associated with said incoming call into a service identity value and a transport capability value using said first table, deriving a respective routing index for said incoming call as a function of said service identity and transport capability values using said second table, and routing said incoming call to a destination switch via a path selected as a function of said routing index, whereby a new class of service may be readily defined by inserting in respective fields of an available record contained in said first table a respective service identity value and associated call information and inserting in respective fields of an available record contained in said second table the service identity and transport capability values associated with the new class of service and a respective routing index.

15. The method set forth in claim 14 wherein said service identity and transport capability values define the class of service that is associated with said incoming call.

16. The method set forth in claim 14 wherein said path is a multiple-link link path and wherein said method includes the step of identifying said multiple-link path as a function of information obtained from said destination switch, said information including the load status of direct paths from said destination switch to other ones of said switches.

17. The method set forth in claim 14 wherein said call information includes information indicating (a) whether said incoming call originated at a local exchange carrier or customer premises equipment; (b) whether the destination is a local exchange carrier, nodal or international switching center; (c) signaling service type; and (d) dialed service type.

* * * * *